United States Patent
Kemmochi

(10) Patent No.: US 10,319,388 B2
(45) Date of Patent: *Jun. 11, 2019

(54) SIGNAL PROCESSING APPARATUS, SIGNAL PROCESSING METHOD, AND PROGRAM

(71) Applicant: Sony Corporation, Tokyo (JP)

(72) Inventor: Chisato Kemmochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,437

(22) Filed: Sep. 4, 2018

(65) Prior Publication Data

US 2018/0374492 A1    Dec. 27, 2018

Related U.S. Application Data

(63) Continuation of application No. 15/536,284, filed as application No. PCT/JP2015/084762 on Dec. 11, 2015, now Pat. No. 10,089,996.

(30) Foreign Application Priority Data

Dec. 26, 2014    (JP) ................................. 2014-264253

(51) Int. Cl.
     *G10L 19/16*      (2013.01)
     *G11B 7/007*      (2006.01)
     (Continued)

(52) U.S. Cl.
     CPC ............ *G10L 19/167* (2013.01); *G10L 19/00* (2013.01); *G11B 7/00736* (2013.01);
     (Continued)

(58) Field of Classification Search
     CPC ......... H04L 12/56; H04L 47/14; H04L 47/26; G10L 19/00; G10L 19/167; G11B 7/00736; G11B 20/12; G11B 2020/10787
See application file for complete search history.

(56) References Cited

U.S. PATENT DOCUMENTS

| 6,704,872 B1 | 3/2004 | Okada |
| 2002/0026310 A1 | 2/2002 | Mochida et al. |

(Continued)

FOREIGN PATENT DOCUMENTS

| EP | 1473939 A1 | 11/2004 |
| EP | 1777965 A1 | 4/2007 |

(Continued)

OTHER PUBLICATIONS

Extended European Search Report dated Apr. 24, 2018 in connection with European Application No. 15872747.9.

(Continued)

*Primary Examiner* — Dominic E Rego

(74) *Attorney, Agent, or Firm* — Wolf, Greenfield & Sacks, P.C.

(57) ABSTRACT

The present technology relates to a signal processing apparatus, a signal processing method, and a program by which, in reproducing transmitted encoded data in real time, buffer overflow can be prevented from occurring on a reception apparatus side even if it is transmitted with a compression rate of the encoded data being varied in a manner that depends on communication condition. Encoded data including transmitted audio data is buffered by a reception buffer. At this time, the quantity of encoded data buffered by the reception buffer is managed in units of processing according to an encoding method. The present technology is applicable to a real-time content reproduction system utilizing a communication system.

11 Claims, 8 Drawing Sheets

(51) Int. Cl.
   *G11B 20/10* (2006.01)
   *G10L 19/00* (2013.01)
   *G11B 20/12* (2006.01)
   *H04L 12/54* (2013.01)
   *H04L 12/801* (2013.01)
   *H04L 12/825* (2013.01)

(52) U.S. Cl.
   CPC ............ *G11B 20/12* (2013.01); *H04L 12/56* (2013.01); *H04L 47/14* (2013.01); *H04L 47/26* (2013.01); *G11B 2020/10787* (2013.01)

(56) References Cited

U.S. PATENT DOCUMENTS

| | | |
|---|---|---|
| 2005/0105557 A1 | 5/2005 | Yamane et al. |
| 2005/0138520 A1* | 6/2005 | Richardson ........ H03M 13/1111 714/755 |
| 2006/0045015 A1 | 3/2006 | Nix et al. |
| 2006/0056518 A1 | 3/2006 | Conklin |
| 2007/0183508 A1 | 8/2007 | Kudo et al. |
| 2007/0237495 A1 | 10/2007 | Terada et al. |
| 2008/0205507 A1* | 8/2008 | Komiya ........... H04N 21/44004 375/240.01 |
| 2008/0253582 A1 | 10/2008 | Sutardja et al. |
| 2009/0196356 A1* | 8/2009 | Houki ............. H04N 21/23424 375/240.25 |
| 2009/0274248 A1 | 11/2009 | Hepler et al. |
| 2010/0020114 A1* | 1/2010 | Lee ...................... G09G 3/3688 345/690 |
| 2013/0188714 A1 | 7/2013 | Kazui et al. |
| 2014/0226716 A1 | 8/2014 | Boon et al. |
| 2015/0350290 A1 | 12/2015 | Yang et al. |
| 2017/0365269 A1 | 12/2017 | Kemmochi |

FOREIGN PATENT DOCUMENTS

| | | |
|---|---|---|
| JP | 2003-309541 A | 10/2003 |
| JP | 2005-043423 A | 2/2005 |
| JP | 2008-003177 A | 1/2008 |
| JP | 2014-131301 A | 7/2014 |
| WO | WO 2006/009087 A1 | 1/2006 |

OTHER PUBLICATIONS

International Search Report and English translation thereof dated Feb. 16, 2016 in connection with International Application No. PCT/JP2015/084762.

Written Opinion and English translation thereof dated Feb. 16, 2016 connection with International Application No. PCT/JP2015/084762.

International Preliminary Report on Patentability and English translation thereof dated Jul. 6, 2017 in connection with International Application No. PCT/JP2015/084762.

\* cited by examiner

SIGNAL PROCESSING APPARATUS, SIGNAL PROCESSING METHOD, AND PROGRAM

CROSS REFERENCE TO RELATED APPLICATIONS

This Application is a Continuation of U.S. application Ser. No. 15/536,284, filed Jun. 15, 2017, entitled "SIGNAL PROCESSING APPARATUS, SIGNAL PROCESSING METHOD, AND PROGRAM", which is a national stage filing under 35 U.S.C. 371 of International Patent Application Serial No. PCT/JP2015/084762, filed Dec. 11, 2015, entitled "SIGNAL PROCESSING APPARATUS, SIGNAL PROCESSING METHOD, AND PROGRAM". Foreign priority benefits are claimed under 35 U.S.C. § 119(a)-(d) or 35 U.S.C. § 365(b) of Japanese application number 2014-264253, filed Dec. 26, 2014. The entire contents of these applications are incorporated herein by reference in their entirety.

TECHNICAL FIELD

The present technology relates to a signal processing apparatus, a signal processing method, and a program, and more particularly to a signal processing apparatus, a signal processing method, and a program, by which, in reproducing encoded data wirelessly transmitted with a compression rate being varied in a manner that depends on communication condition, a reproduction delay time can be made constant irrespective of the compression rate at the start of reproduction.

BACKGROUND ART

There is a reproduction system, which is called Bluetooth Advanced Audio Distribution Profile (hereinafter, also referred to as Bluetooth A2DP), in which wireless transmission and reproduction are performed at the same time in real time. This reproduction system employs a technology of preventing sound interruption by accumulating a certain quantity of encoded audio data (hereinafter, also simply referred to as encoded data) in a buffer on a receiver side (hereinafter, also simply referred to as reception buffer) before it is reproduced on the receiver side (see Patent Literature 1).

Determination of reproduction start in the technology of Patent Literature 1 above is based on the quantity of accumulated data (number of bytes, number of words, etc.). For example, if encoded data equivalent to 60% of the buffer size in the reception buffer is received (accumulated), it is determined that reproduction should be started. In addition, there has also been proposed to estimate transmission condition and vary the compression rate.

However, in such a system, a time until reproduction is started, that is, a delay time can be varied if the compression rate in encoding processing is varied. In addition, the buffer size of the reception buffer on the reception side can be exceeded if the compression rate is varied during reproduction.

In view of this, in order to avoid data overflow of the reception buffer, there has been proposed a technology of adaptively changing transmission/reception (see Patent Literature 2). That is, in the method of Patent Literature 2, the overflow of the reception buffer is avoided in such a manner that, if the reception buffer buffers data corresponding to a defined number of bytes or more, an apparatus on the reception side transmits a status to a transmission side and a data flow to be transmitted is controlled and changed on the transmission side.

CITATION LIST

Patent Literature

Patent Literature 1: Japanese Patent Application Laid-open No. 2003-309541
Patent Literature 2: Japanese Patent Application Laid-open No. 2014-131301

DISCLOSURE OF INVENTION

Technical Problem

However, in the case of using the technology of Patent Literature 2, there is a possibility that some data cannot be transmitted on the transmission side. Further, it is assumed that such data is accumulated in the buffer on the transmission side at this time. Therefore, if the transmission environment is deteriorated and the transmission is delayed, there is a possibility that the buffer on the transmission side may experience overflow more early as compared to the case where the accumulation is not performed. In addition, it cannot vary the reproduction start time in a manner that depends on the compression rate.

It is necessary to consume or discard encoded data on the reception side more rapidly than normal in order to keep the delay time constant after sound interruption that may occur in the case where transmission/reception is delayed, for example.

A factor that varies the delay time is that a certain quantity of untransmitted data is accumulated on the transmission side, for example, if the transmission environment is deteriorated in wireless transmission.

The accumulated untransmitted data is encoded data that should be originally accumulated in the reception buffer and reproduced. Thus, it is desirable that the accumulated untransmitted data be early transmitted and received. Therefore, after the transmission environment recovers, the accumulated untransmitted data is continuously transmitted at transmission intervals shorter than normal. However, if a measure, for example, making the reproduction speed higher than normal on the reception side is not carried out, the delay time varies due to the influence of, for example, a difference between a buffer capacity on the transmission side and a buffer capacity on the reception side.

However, there is no guarantee that the compression rate at the start of reproduction is equal to the compression rate in processing after the sound interruption. In the case of management based on the quantity of data, there has been a fear that the delay time cannot be compensated for by using the encoded data.

Further, it is also conceivable that restoration is performed in accordance with a reproduction method of performing reproduction while performing fast forwarding or decimation. However, intervals of reproduction sound in the restoration are changed due to performing reproduction while performing fast forwarding or decimation. Thus, there has been a fear that it may give discomfort to a listener.

The present technology has been made in the above-mentioned circumstances, particularly to enable, in reproducing transmitted encoded data in real time, the transmitted encoded data to be reproduced on a reception side without being influenced by a delay time even if the encoded data is transmitted with a compression rate of the encoded data being varied in a manner that depends on communication condition.

Solution to Problem

A signal processing apparatus according to an aspect of the present technology includes: a receiver that receives encoded data encoded in accordance with a predetermined encoding method, which is transmitted; a storage unit that stores the encoded data received by the receiver; a decoder that decodes the encoded data stored in the storage unit, in accordance with a method corresponding to the predetermined encoding method; and a decoding management unit that controls decoding by the decoder to be permitted on the basis of the number of units of decoding processing in the encoded data, which are stored in the storage unit, in the predetermined encoding method when decoded by the decoder.

The decoding management unit may control decoding by the decoder to be permitted when the number of units of decoding processing in the encoded data, which are stored in the storage unit, is larger than a predetermined threshold.

The signal processing apparatus can further include a switching unit that switches an output of the storage unit to the decoder or others, and the decoding management unit can control, when the number of units of decoding processing in the encoded data, which are stored in the storage unit, is larger than a predetermined threshold, the switching unit to connect the output of the storage unit to the decoder to thereby control decoding by the decoder to be permitted.

The signal processing apparatus can further include a restoration measure unit that determines, on the basis of the number of units of decoding processing in the encoded data, which are stored in the storage unit, whether or not to turn on a restoration measure mode on which a restoration measure processing is performed, and performs the restoration measure processing, the restoration measure processing being a measure for preventing a state in which all the encoded data cannot be decoded by the decoder in the case where a transmission state of the encoded data is delayed due to deterioration of a transmission environment and then the transmission environment is restored and the encoded data are collectively transmitted.

The restoration measure unit can turn on the restoration measure mode when the number of units of decoding processing in the encoded data, which are stored in the storage unit, is 0. The signal processing apparatus can further include a discard management unit that discards, in units of decoding processing, part of the encoded data stored in the storage unit when the restoration measure mode is on and the number of units of decoding processing in the encoded data, which are stored in the storage unit, is larger than a reference value based on the predetermined threshold.

The discard management unit can discard, in units of decoding processing, the encoded data stored in the storage unit, which exceeds the reference value based on the predetermined threshold in terms of the number of units of decoding processing.

The discard management unit can discard, in units of decoding processing, the encoded data stored in the storage unit, which corresponds to a quantity set correspondingly to an increment in the number of units of decoding processing per unit time.

The signal processing apparatus can further include: a switching unit that switches an output of the storage unit to the decoder or others; and a discard unit that discards, in units of decoding processing, part of the encoded data stored in the storage unit. The discard management unit can control, when discarding, in units of decoding processing, the part of the encoded data stored in the storage unit, the switching unit to connect the output of the storage unit to the discard unit to thereby discard, in units of decoding processing, the part of the encoded data stored in the storage unit.

The restoration measure unit can calculate a state variable at predetermined time intervals on the basis of a mean and a variance of the number of units of decoding processing in the encoded data, which are stored in the storage unit, in a predetermined period, and turn off the restoration measure mode when a state in which a difference absolute value from a predetermined reference value is smaller than a predetermined threshold continues.

The signal processing apparatus can further include a sequence that stores a comparison result obtained by the restoration measure unit comparing a difference absolute value between the state variable, which is calculated at the predetermined time intervals, and a predetermined reference value with a predetermined threshold. The restoration measure unit can turn off the restoration measure mode when a state in which the state variable calculated at the predetermined time intervals on the basis of the comparison result stored in the sequence, the difference absolute value from the predetermined reference value is smaller than the predetermined threshold continues.

The encoded data can be obtained by encoding audio data to be output as audio through a speaker. The signal processing apparatus can further include a mute controller that controls an output level of audio from the speaker, which is based on the audio data decoded by the decoder. When the restoration measure mode is on, the mute controller can control the output level of the audio from the speaker, which is based on the audio data decoded by the decoder, to be lowered.

A signal processing method according to an aspect of the present technology includes the steps of: receiving encoded data encoded in accordance with a predetermined encoding method, which is transmitted; storing the received encoded data; decoding the stored encoded data in accordance with a method corresponding to the predetermined encoding method; and controlling decoding to be permitted on the basis of the number of units of decoding processing in the stored encoded data in the predetermined encoding method when decoded.

A program according to an aspect of the present technology causes a computer to function as: a receiver that receives encoded data encoded in accordance with a predetermined encoding method, which is transmitted; a storage unit that stores the encoded data received by the receiver; a decoder that decodes the encoded data stored in the storage unit, in accordance with a method corresponding to the predetermined encoding method; and a decoding management unit that controls decoding by the decoder to be permitted on the basis of the number of units of decoding processing in the encoded data, which are stored in the storage unit, in the predetermined encoding method when decoded by the decoder.

In an aspect of the present technology, encoded data encoded in accordance with a predetermined encoding method, which is transmitted, is received. The received encoded data is stored. The stored encoded data is decoded in accordance with a method corresponding to the predetermined encoding method. Decoding is controlled to be permitted on the basis of the number of units of decoding processing in the encoded data in the predetermined encoding method when decoded.

The signal processing apparatus according to an aspect of the present technology may be an independent apparatus or may be a block that realizes signal processing.

Advantageous Effects of Invention

In accordance with an aspect of the present technology, it becomes possible to reproduce, when reproducing transmitted encoded data in real time, the transmitted encoded data on a reception side without being influenced by a delay time even if the encoded data is transmitted with a compression rate of the encoded data being varied in a manner that depends on communication condition.

MODE(S) FOR CARRYING OUT THE INVENTION

Figure 1:
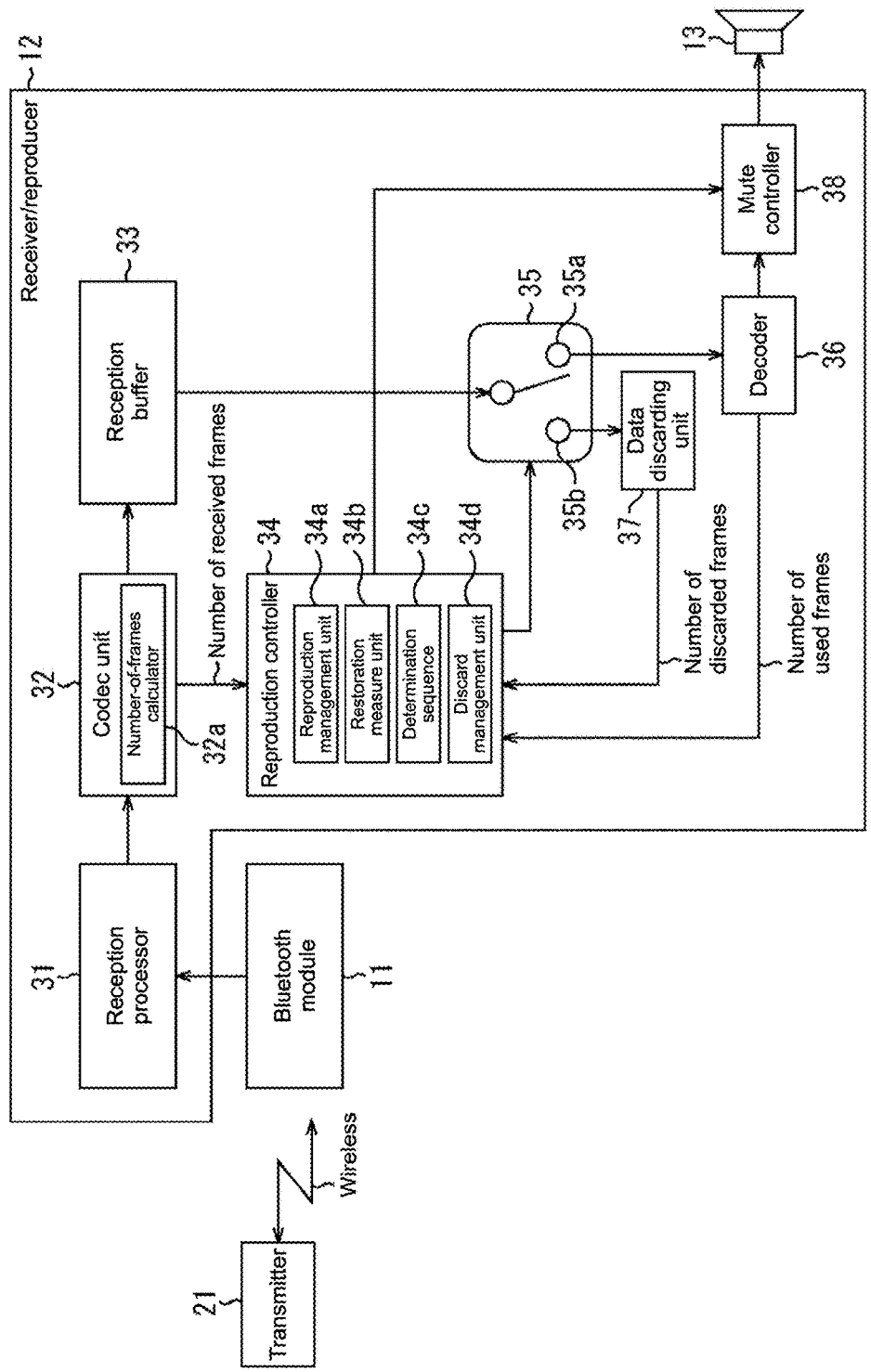
FIG. 1 A diagram describing a configuration example of a first embodiment of an audio reproduction system to which the present technology is applied.

<Configuration Example of First Embodiment of Audio Reproduction System>
FIG. 1 shows a configuration example of an audio reproduction system to which the present technology is applied.

The audio reproduction system of FIG. 1 is constituted of a Bluetooth module 11, a receiver/reproducer 12, a speaker 13, and a transmitter 21. In the audio reproduction system of FIG. 1, the transmitter 21 transmits encoded data including audio data encoded in accordance with Bluetooth Advanced Audio Distribution Profile (hereinafter, also referred to as Bluetooth A2DP), the receiver/reproducer 12 receives it via the Bluetooth module 11, decodes it, and outputs it as audio through the speaker 13. At this time, the receiver/reproducer 12 manages buffering of the encoded data on a frame-by-frame basis, the frame being a minimum unit of processing of an audio encoding method in the Bluetooth A2DP. In this manner, even if the encoded data is transmitted with a compression rate being varied in a manner that depends on communication condition, the encoded data can be reproduced without being influenced by a delay time.

The Bluetooth module 11 receives packets of the Bluetooth A2DP that are transmitted from the transmitter 21, processes respective layers of a link manger, a base band, and an RF (Radio Frequency) in accordance with L2CAP (Logical Link Control and Adaptation Protocol) protocol, and outputs base-band packets to a reception processor 31 of the receiver/reproducer 12 via an HCI (Host Controller Interface).

The receiver/reproducer 12 is, for example, so-called Host CPU (Host Central Processing Units), and includes the reception processor 31, a codec unit 32, a reception buffer 33, a reproduction controller 34, a switch 35, a decoder 36, a data discarding unit 37, and a mute controller 38.

Note that, although a configuration example in which the Bluetooth module 11 and the receiver/reproducer 12 are individually provided is shown in the example of FIG. 1, they may be integrally configured.

Further, in this embodiment, for the sake of simplifying the description, an example of recording the number of frames transmitted in a single packet at the head of a media payload of the A2DP on the transmission side will be described. However, instead of recording the number of frames on the transmission side, the number of frames may be calculated by parsing the media payload on the reception side, for example.

The reception processor 31 receives received data from the Bluetooth module 11 via the HCI, processes the received data in accordance with the L2CAP and AVDTP (AV Distribution Transport Protocol) and restores the media payload, and outputs the media payload to the codec unit 32.

The codec unit 32 includes a number-of-frames calculator 32a. The codec unit 32 causes the number-of-frames calculator 32a to calculate information on the number of frames of the encoded data recorded in the media payload that is supplied from the reception processor 31 to restore the information, and supplies the information to the reproduction controller 34 as information on the number of received frames. Further, the codec unit 32 restores the encoded data, which is recorded in the media payload, and causes the reception buffer 33 to store the encoded data.

Note that the term "frame" set forth herein refers to a unit of processing of encoding conversion that is defined in accordance with an audio encoding method, for example, AAC (Advanced Audio Coding) or ATRAC (Adaptive TRansform Acoustic Coding). Further, hereinafter, the description will be made assuming that processing is performed on a frame-by-frame basis. However, the unit of processing may be one other than the frame in a manner that depends on an encoding method. Also, the encoding method may be an encoding method other than those mentioned above.

The reproduction controller 34 subtracts the number of used frames supplied from the decoder 36 and the number of discarded frames supplied from the data discarding unit 37 from the number of received frames supplied from the codec unit 32 to thereby update the number of recorded frames. The number of recorded frames expresses the encoded data stored in the reception buffer 33 as the number of frames. Further, the term "the number of used frames" set forth herein is the number of frames of stored frames stored in the reception buffer 33, which are read and reproduced by the decoder 36. Here, the term "the number of discarded frames" is the number of frames corresponding to encoded data of the encoded data stored in the reception buffer 33, which is discarded by the data discarding unit 36.

In addition, if the reproduction controller 34 has not yet started reproduction, the reproduction controller 34 determines whether or not the number of recorded frames has reached a predetermined threshold. If the number of recorded frames has reached the predetermined threshold, the reproduction controller 34 turns on a reproduction-permitted mode and controls the switch 35 to supply the encoded data stored in the reception buffer 33 to the decoder 36 and start reproduction. This predetermined threshold may be set in advance during design or may be adjusted by a user. The reproduction controller 34 controls the mute controller 38 to mute audio output to be output to the speaker 13 by the decoder 36.

Further, the reproduction controller 34 includes a reproduction management unit 34a, a restoration measure unit 34b, a determination sequence 34c, and a discard management unit 34d. The reproduction management unit 34a calculates the number of recorded frames described above. The reproduction management unit 34a compares the number of recorded frames with the predetermined threshold. If it is larger than the predetermined threshold, the reproduction management unit 34a turns on a flag of the reproduction-permitted mode and connects the switch 35 to a terminal 35a to sequentially supply encoded data stored in the reception buffer 33 to the decoder 36. Thus, audio reproduction is permitted.

The restoration measure unit 34b turns on a flag of a restoration measure mode on the basis of whether or not the number of recorded frames is 0. The fact that the number of recorded frames is 0 can be considered to mean that data transmitted from the transmitter 21 cannot be received due to deterioration of the transmission state and the encoded data stored in the reception buffer 33 is not present. In such a case, if the transmission state recovers, encoded data which have not been transmitted are transmitted. Thus, the reproducible state is restored.

However, when the state in which audio can be reproduced is thus restored, many encoded data which have not been transmitted are transmitted at once. Therefore, there is a fear that buffer overflow may occur in the reception buffer 33. In view of this, the restoration measure unit 34b turns on the flag of the restoration measure mode, performs restoration measure processing thereof in cooperation with the discard management unit 34d, and suppresses the occurrence of the buffer overflow by, for example, discarding encoded data of the reception buffer 33. Further, when performing the restoration measure processing, the restoration measure unit 34b determines a state variable that represents an indicator of change in the number of recorded frames in a state in which a frame to be discarded is not present, and causes the determination sequence 34c including FIFO to sequentially store a comparison result of the state variable with the predetermined threshold. Then, the restoration measure unit 34b determines whether or not to terminate the restoration measure mode on the basis of the comparison result stored in the determination sequence 34c.

When the flag of the restoration measure mode is turned on, the discard management unit 34d calculates the number of frames to be discarded out of the encoded data stored in the reception buffer 33, on the basis of the number of recorded frames. Then, the discard management unit 34d controls the switch 35 to be connected to a terminal 35b to supply encoded data of the encoded data stored in the reception buffer 33, which correspond to the calculated number of frames to be discarded, to the data discarding unit 37. Then, the supplied encoded data is discarded by the data discarding unit 37.

The switch 35 is controlled by the reproduction controller 34 to be connected to the terminal 35a such that the output of the reception buffer 33 is output to the decoder 36, to be connected to the terminal 35b such that the output of the reception buffer 33 is output to the data discarding unit 37, or not to be connected to either of the terminals 35a and 35b such that the output of the reception buffer 33 is not output to either of them.

When the switch 35 is controlled by the reproduction controller 34 such that the encoded data can be supplied from the reception buffer 33, the decoder 36 retrieves the encoded data from the reception buffer 33 at regular time intervals in accordance with decoding settings, performs decoding processing thereon, and outputs the decoded data to the speaker 13 via the mute controller 38 for outputting the decoded data as audio. For example, the reception buffer 33 is configured in an FIFO (Fast In Fast Out) format. The decoder 36 sequentially retrieves encoded data in order of oldest to newest and reproduces them as audio and outputs the audio through the speaker 13.

Further, when the switch 35 is controlled by the reproduction controller 34 such that the encoded data can be supplied from the reception buffer 33, the data discarding unit 37 reads and discards encoded data from the reception buffer 33.

<Reproduction Processing by Receiver/Reproducer of FIG. 1>

Next, reproduction processing by the audio reproduction system of FIG. 1 will be described. Note that processing in which encoded data for reproducing audio through processing of L2CAP and AVDTP are sequentially transmitted from the transmitter 21 and received and reproduced as audio by the receiver/reproducer 12 will be described here.

In Step S11, the Bluetooth module 11 determines whether or not packets of the Bluetooth A2DP including audio data have been transmitted and received from the transmitter 21. Then, for example, if the packets of the Bluetooth A2DP including audio data have been transmitted and received from the transmitter 21 through wireless communication, the processing proceeds to Step S12.

In Step S12, the Bluetooth module 11 receives packets of the Bluetooth A2DP, processes layers of a link manger, a base band, and a RF (Radio Frequency) in accordance with L2CAP (Logical Link Control and Adaptation Protocol) protocol, and outputs base-band packets to the reception processor 31 of the receiver/reproducer 12 via an HCI (Host Controller Interface). The reception processor 31 restores media payload data from the received base-band packets and supplies the media payload data to the codec unit 32.

In Step S13, the codec unit 32 controls the number-of-frames calculator 32a to calculate the number of frames of the audio encoding method, which are units of processing of an audio signal, as the number of received frames on the basis of the received media payload data, and supplies it to the reproduction controller 34. Further, the codec unit 32 decodes and restores the encoded data from the media payload data and supplies the decoded and restored data to the reception buffer 33 for storing the decoded and restored data.

In Step S14, the reproduction controller 34 controls the reproduction management unit 34a to subtract the sum of the number of used frames read and reproduced from the reception buffer 33 by the decoder 36 and the number of discarded frames read and discarded from the reception buffer 33 by the data discarding unit 37 from the preceding number of recorded frames. In addition, the reproduction controller 34 controls the reproduction management unit 34a to add the number of received frames to the result of subtraction to thereby determine the current number of recorded frames recorded in the reception buffer 33. Thus, it is expressed as follows: the current number of recorded frames=the preceding number of recorded frames−(the number of discarded frames+the number of used frames)+the number of received frames. Thereafter, the reproduction management unit 34a repeats such processing to thereby sequentially update the current number of recorded frames. Note that, in first processing, the preceding number of recorded frames, the number of used frames, and the number of discarded frames are all 0, and hence the number of received frames is the number of recorded frames.

In Step S15, the reproduction controller 34 controls the restoration measure unit 34b to execute the restoration measure processing. The restoration measure processing is for the case where the encoded data cannot be received due to deterioration of the transmission environment and sound interruption occurs, the transmission environment is restored, and the encoded data can be received and audio can be output again. Note that the restoration measure processing will be described later in detail with reference to the flowchart of FIG. 3.

In Step S16, the reproduction controller 34 controls the reproduction management unit 34a to determine whether or not it is necessary to determine anew whether or not the flag of the reproduction-permitted mode is not on and whether or not the flag of the reproduction-permitted mode is on. In Step S16, if the flag of the reproduction-permitted mode is not on and it is necessary to determine anew whether or not to turn on the reproduction-permitted mode, the reproduction management unit 34a considers that it is necessary to determine whether or not it is the reproduction-permitted mode and the processing proceeds to Step S17.

In Step S17, the reproduction management unit 34a determines whether or not to turn on the reproduction-permitted mode, on the basis of whether or not the number of recorded frames currently recorded in the reception buffer 33 is larger than a predetermined threshold. In Step S17, for example, if the number of recorded frames is larger than the predetermined threshold, the reproduction management unit 34a turns on the flag of the reproduction-permitted mode in Step S18. Note that, for example, if the number of recorded frames is smaller than the predetermined threshold in Step S17, the reproduction management unit 34a turns off the flag of the reproduction-permitted mode in Step S19.

In Step S20, the reproduction management unit 34a determines whether or not the reproduction-permitted mode is on, and, if the reproduction-permitted mode is on, the processing proceeds to Step S21.

In Step S21, the reproduction management unit 34a controls the switch 35 such that the encoded data can be supplied to the decoder 36 from the reception buffer 33, and supplies the encoded data to the decoder 36. The decoder 36 reads and decodes the encoded data, generates audio data, and causes the speaker 13 to output and reproduce audio via the mute controller 38.

Note that, in the first processing, audio is output through the speaker 13 because the mute controller 38 is set to be in a mute-off state by default. Thereafter, when the mute controller 38 is in a mute-on state, an audio signal is output to the speaker 13 from the decoder 36 but audio is not output through the speaker 13.

In Step S22, the reception processor 31 determines whether or not termination of the processing is instructed, and terminates the processing if the termination is instructed. Further, in Step S22, if the termination of the processing is not instructed, the processing proceeds to Step S23.

In Step S23, the reception processor 31 determines whether or not a predetermined time has elapsed, and repeats similar processing until the predetermined time has elapsed. If the predetermined time has elapsed, the processing returns to Step S11. That is, the series of processing of Steps S11 to S23 is repeatedly executed at predetermined time intervals until a termination instruction is given.

Further, in Step S11, if packets are not received, the processing of Steps S12 to S14 are skipped. In addition, in Step S16, if it is not necessary to determine whether or not the reproduction-permitted mode is on, the processing of Steps S17 to S19 is skipped.

Further, in Step S20, if the reproduction-permitted mode is not on, the processing of Step S21 is skipped and the reproduction processing is not performed.

In the above-mentioned processing, the encoded data accumulated in the reception buffer 33 is sequentially read, and whether or not to turn on the flag of the reproduction-permitted mode for permitting decoding and reproduction is determined on a frame-by-frame basis, which are units of processing of the encoding method, for example, the number of recorded frames. With this, management can be performed in units of processing that are the number of frames even in the case where the encoding method is changed or the compression rate is varied during communication. Thus, it becomes possible to compensate for the delay time within a certain range and it becomes possible to suppress the occurrence of the buffer overflow of the reception buffer 33.

<Restoration Measure Processing by Receiver/Reproducer of FIG. 1>

Figure 3:
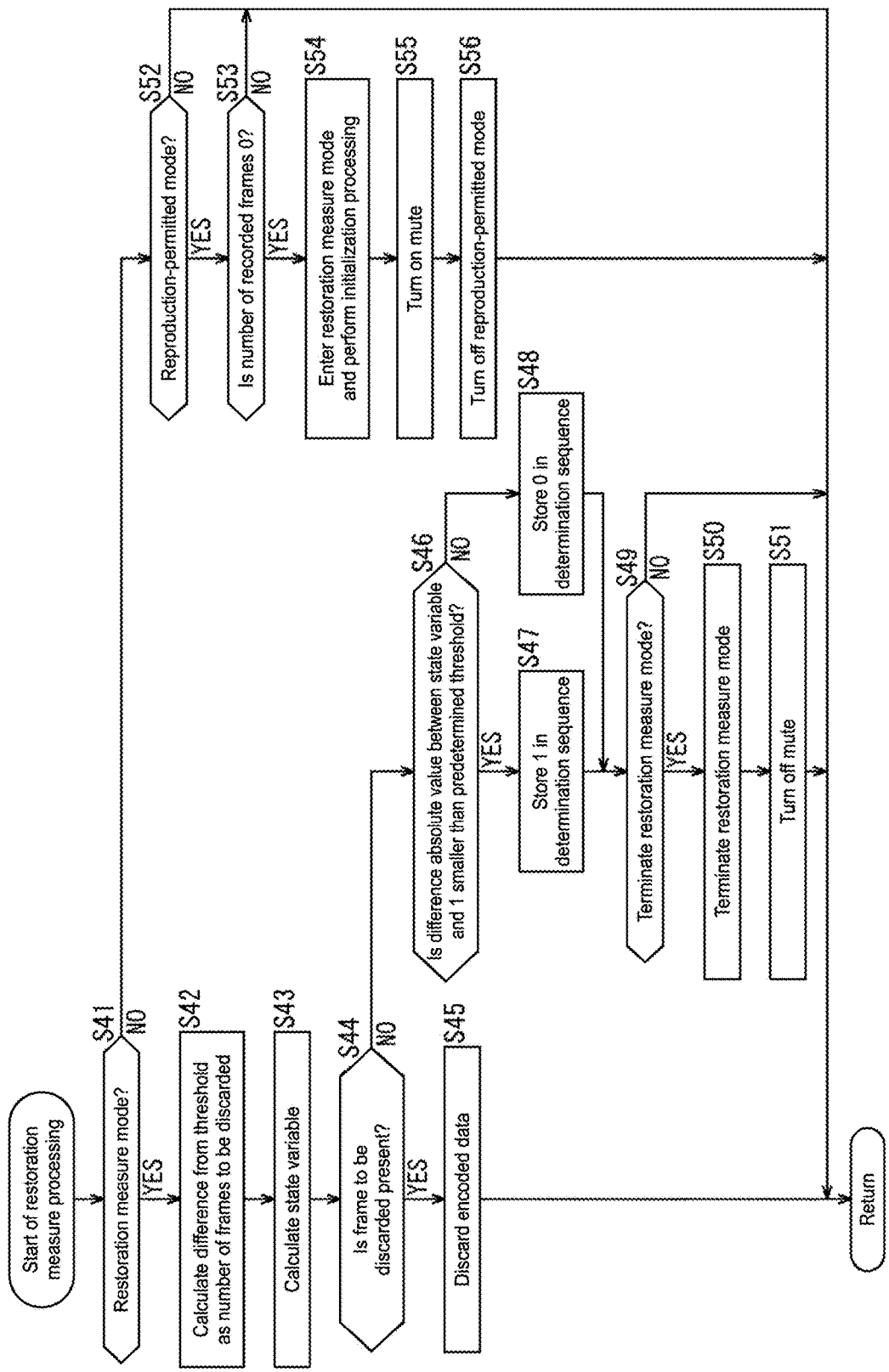
FIG. 3 A flowchart describing restoration measure processing in the audio reproduction system of FIG. 1.

Next, the restoration measure processing will be described with reference to the flowchart of FIG. 3. This restoration measure processing is measure processing for avoiding a situation where overflow of the reception buffer 33 occurs and a delay time cannot be compensated for. This situation occurs in the case where the transmission environment is deteriorated during reproduction of audio signals, the transmission is delayed, and sound interruption occurs, and then the transmission environment is improved and the thus delayed encoded data are transmitted at once.

In Step S41, the reproduction controller 34 controls the restoration measure unit 34b to determine whether or not the restoration measure mode is on. More specifically, the restoration measure unit 34b determines whether or not the flag of the restoration measure mode is turned on. In Step S41, for example, if the flag of the restoration measure mode is not turned on, the processing proceeds to Step S52.

In Step S52, the restoration measure unit 34b inquires the reproduction management unit 34a and determines whether or not the flag of the reproduction-permitted mode is turned on. In Step S52, if it is determined that the reproduction-permitted mode is on, the processing proceeds to Step S53.

In Step S53, the restoration measure unit 34b determines whether or not the number of recorded frames is 0. That is, whether or not accumulated encoded data have been all reproduced, exhausted in the case where transmitted encoded data cannot be received due to deterioration of the transmission environment is determined. In Step S53, if it is determined that the number of recorded frames is 0, the processing proceeds to Step S54. That is, in this case, a state in which encoded data cannot be sufficiently received due to the deterioration of the transmission environment continues and reproduction is impossible.

In Step S54, the restoration measure unit 34b turns on the flag of the restoration measure mode to enter the restoration measure mode, and performs initialization processing on the restoration measure mode. Here, the initialization processing is, for example, processing of initializing the state variable, which will be described later, and values of the determination sequence 34c for determining termination of the restoration measure mode.

In Step S55, the restoration measure unit 34b controls the mute controller 38 to prevent the output of audio from the speaker 13 in accordance with the audio data output from the decoder 36 thereafter. That is, thereafter, encoded data will be intensively transmitted correspondingly to the delay of the transmission due to the deterioration of the transmission environment. Therefore, in order to avoid the overflow of the reception buffer 33, processing in which part of the encoded data is discarded by processing to be described later is performed, for example. Thus, there is a fear that reproduced audio may have noise mixed or may be output as abnormal sound. Therefore, in order to prevent the audio output during this time, the mute controller 38 is brought into the mute-on state.

In Step S56, the number of recorded frames of the reception buffer 33 is 0, and hence the reproduction controller 34 turns off the flag of the reproduction-permitted mode to terminate the reproduction-permitted mode and terminates the restoration measure processing.

Figure 2:
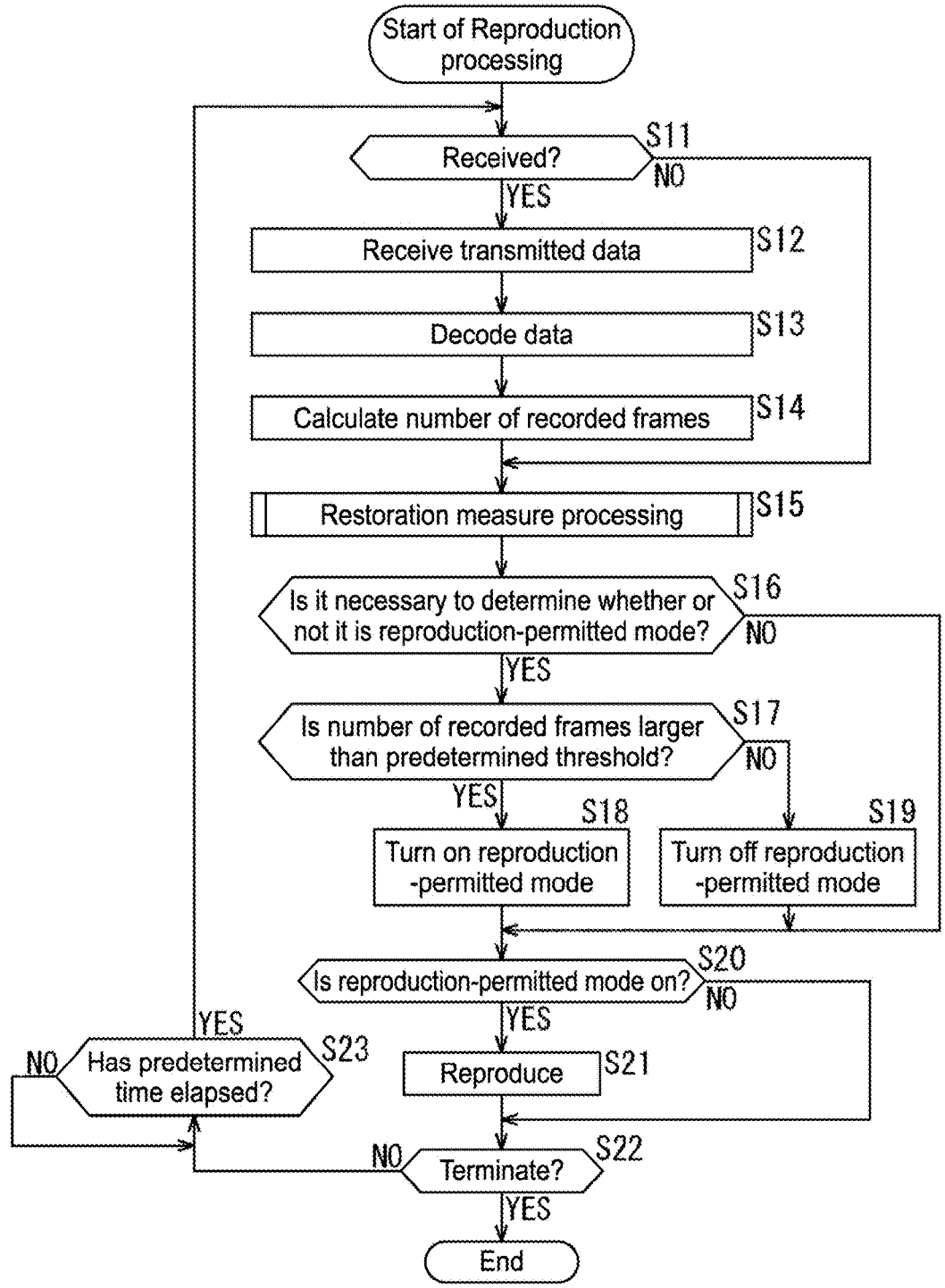
FIG. 2 A flowchart describing reproduction processing in the audio reproduction system of FIG. 1.

Further, after that, when the restoration measure processing is re-started after the series of processing of the flowchart in FIG. 2, the flag of the restoration measure mode has been turned on. Therefore, in Step S41, it is determined that the restoration measure mode is on and the processing proceeds to Step S42.

In Step S42, the reproduction controller 34 controls the discard management unit 34d to calculate the number of frames to be discarded. More specifically, when setting the flag of the reproduction-permitted mode, for example, the discard management unit 34d sets a discard threshold as a reference value obtained by adding a certain margin to the predetermined threshold to be compared to the number of recorded frames. The discard management unit 34d calculates the number of frames of the number of recorded frames, which exceeds this discard threshold, as the number of frames to be discarded. Alternatively, when the reference number of frames is exceeded, for example, the discard management unit 34d may calculate a predetermined number of frames, which are set during design, as the number of frames to be discarded.

In Step S43, the restoration measure unit 34b calculates and updates the state variable. Here, the state variable is, for example, a numerical value representing an indicator indicating whether or not a mean and a variance of the number of recorded frames within a predetermined observation time determined during design are values of a predetermined range. For example, a numerical value representing an indicator indicating whether or not a mean of the number of recorded frames within a predetermined observation time determined during design falls within ±10% of a predetermined threshold for determining the flag of the reproduction-permitted mode or a numerical value representing an indicator indicating whether or not a variance falls within a reference range defined during design is used as the state variable.

Here, the restoration measure unit 34b compares respective references in percentage terms, for example, and uses a value obtained by multiplying comparison results thereof as the state variable. More specifically, for example, provided that the mean of the number of recorded frames within the predetermined observation time is 90% of the threshold for determining the flag of the reproduction-permitted mode and the variance of the number of recorded frames within the predetermined observation time is 80% of the reference value, the reproduction controller 34 multiplies both to determine 72% (=90%×80%=0.72). In this manner, the state variable is a value that is closer to 100% (=1.0) as the mean becomes closer to the predetermined threshold for determining the flag of the reproduction-permitted mode and the variance becomes closer to the reference value, that is, as they become closer to the set values.

Alternatively, the state variable may be, for example, a ratio of an amount of change in the number of recorded frames per predetermined time to an amount of change in the number of used frames per predetermined time. That is, in this case, if the amount of change in the number of recorded frames per predetermined time and the amount of change in the number of used frames per predetermined time are suitably set, changes in both become almost identical values and the ratio of the both that is the state variable is also a value near 1 (=100%).

In Step S44, the discard management unit 34d determines whether or not a frame to be discarded is present, on the basis of the calculation result of the number of frames to be discarded. For example, if the number of frames to be discarded is present, the processing proceeds to Step S45.

In Step S45, the discard management unit 34d discards encoded data of the encoded data stored in the reception buffer 33, which correspond to the number of frames to be discarded, and the processing ends. More specifically, the discard management unit 34d controls the switch 35 to be connected to the terminal 35b to thereby supply the encoded data to the data discarding unit 37. The data discarding unit 37 discards the supplied encoded data.

Note that, when discarding the encoded data, for example, when discarding encoded data, which correspond to a plurality of frames, they may be discarded by performing decimation at regular frame intervals. By doing so, continuity and consistency of left encoded data on a frame-by-frame basis can be maintained.

That is, in the case where transmission of encoded data is delayed due to the deterioration of the transmission state, the restoration measure mode is started, the encoded data are transmitted at once, and a state in which too much encoded data to be processed is accumulated in the reception buffer 33 continues, the processing of Steps S41 to S45 above is repeated and the encoded data is continuously discarded.

On the other hand, in Step S44, if it is determined that the frame to be discarded is not present, that is, if it is determined that the encoded data of the frame to be discarded is not recorded in the reception buffer 33, the processing proceeds to Step S46.

In Step S46, the restoration measure unit 34b determines whether or not a difference absolute value between the state variable and 1 is smaller than a predetermined threshold, that is, whether or not the transmission state is stable and the number of recorded frames is in a state closer to a set operation state. In Step S46, for example, if it is determined that the difference absolute value between the state variable and 1 is smaller than the predetermined threshold, if the transmission state is stable and it is in the state closer to the set operation state, the processing proceeds to Step S47.

In Step S47, the restoration measure unit 34b overwrites an oldest value of the determination sequence 34c for determining the termination of the restoration measure mode, with a value of 1 indicating that the transmission state is stable and it is in the state closer to the set operation state, and stores the value of 1.

Further, in Step S46, if it is determined that the difference absolute value between the state variable and 1 is not smaller than the predetermined threshold, the transmission state is instable and it is not in the state closer to the set operation state, the restoration measure unit 34b overwrites, in Step S48, the oldest value of the determination sequence 34c, with a value of 0 indicating that the transmission state is instable and it is not in the state closer to the set operation state, and stores the value of 0.

In Step S49, the restoration measure unit 34b reads information of the determination sequence 34c and determines whether or not to terminate the restoration measure mode on the basis of, for example, whether or not all the stored values are 1, that is, whether or not a state in which the difference absolute value between the state variable and 1 stored in the determination sequence 34c is smaller than the predetermined threshold continues a predetermined number of times. In Step S49, for example, if all the values stored in the determination sequence 34c are 1, the restoration measure unit 34b determines to terminate the restoration measure mode and the processing proceeds to Step S50.

In Step S50, the restoration measure unit 34b turns off the flag of the restoration measure mode to terminate the restoration measure mode.

In Step S51, the reproduction controller 34 controls the mute controller 38 not to mute the audio data output from the decoder 36 such that the audio data can be supplied to the speaker 13 and output as audio.

In addition, in Step S49, if all the values stored in the determination sequence 34c are not 1, it is necessary to continue the restoration measure mode, and hence the processing of Steps S50 and S51 is skipped. Then, the restoration measure processing is terminated.

In the above-mentioned processing, if the transmission state becomes unstable and the state in which the encoded data is not stored in the reception buffer 33 continues, the flag of the reproduction-permitted mode is turned off and the flag of the restoration measure mode is turned on. As the restoration measure processing, encoded data excessively transmitted when the transmission state is restored is discarded on a frame-by-frame basis. Thus, even if encoded data at various compression rates are transmitted when the transmission state recovers such that reproduction can be performed again, the encoded data is discarded on the basis of the number of frames that is the unit of processing, and hence compensation for the delay time using the encoded data can be realized.

Further, mute is turned on by the mute controller 38 on the restoration measure mode. Thus, audio like noise is not output. The audio like noise is generated by decoding and reproducing discarded encoded data in a manner that depends on needs after the transmission state recovers such that the encoded data can be stored in the reception buffer 33 and the flag of the reproduction-permitted mode is turned on. Thus, generation of the audio output like noise can be suppressed, and hence it becomes possible to prevent discomfort from being given to a listener.

Further, an operation state of the reception buffer 33 is managed on the basis of the number of recorded frames recorded in the reception buffer 33. Therefore, designing for suitably preventing the occurrence of the buffer overflow is facilitated.

In addition, the restoration measure processing is performed as processing that is part of the reproduction processing. Thus, it can be concurrently executed even in a state in which the transmission state is improved, the flag of the reproduction-permitted mode is turned on, the encoded data is sequentially decoded, and audio is output. Therefore, the encoded data can also be discarded while audio is reproduced. In such a case, instead of completely stopping the audio output from the speaker 13 by the mute controller 38, it may be output with a sound volume smaller than normal. By doing so, main audio can be output, and hence it becomes possible for a listener to listen to the audio output. In addition, even in the case of audio having a little noise, the sound volume is reduced, and hence it becomes possible to reduce the discomfort.

<Configuration Example of Second Embodiment of Audio Reproduction System>

Figure 4:
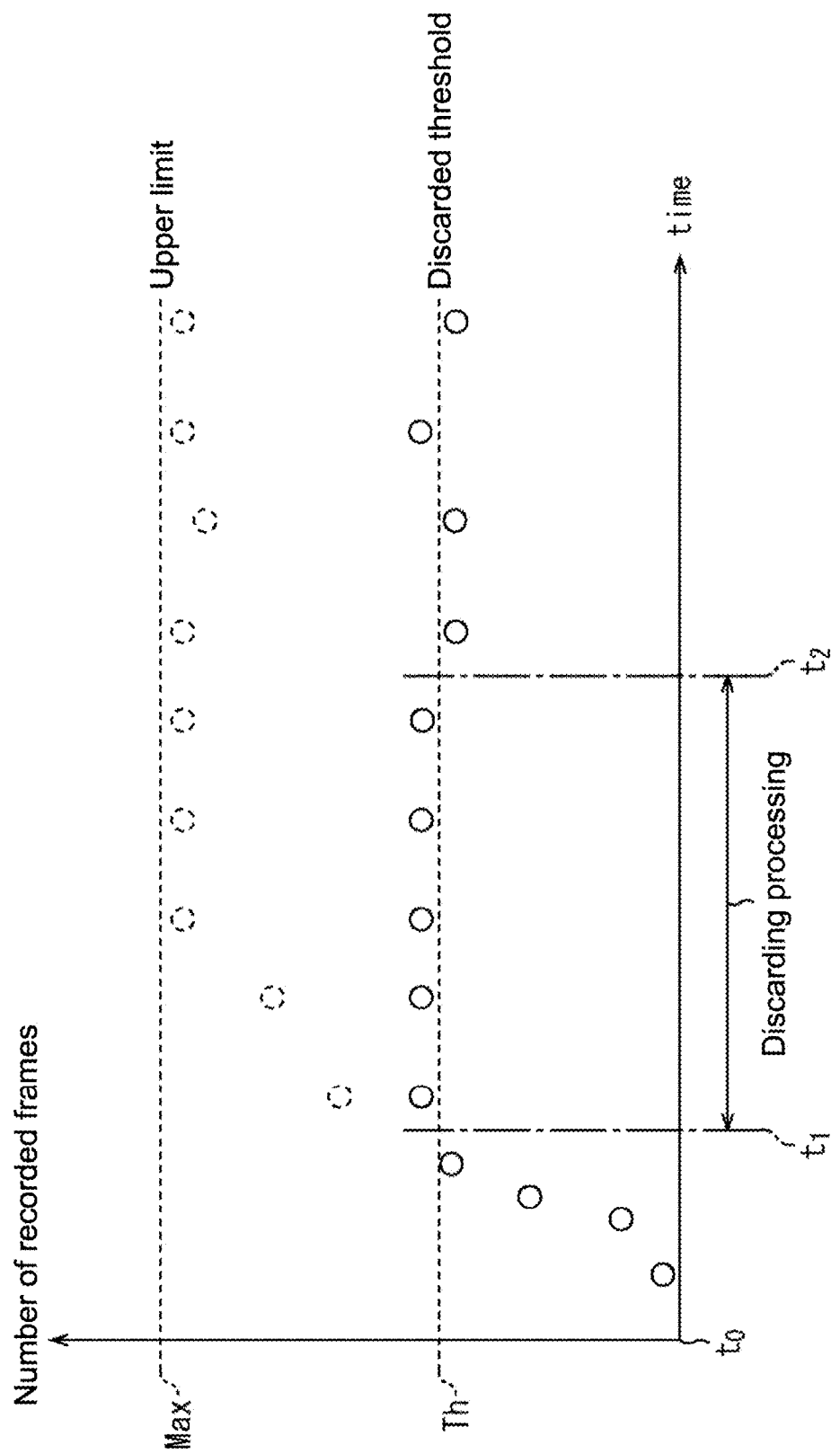
FIG. 4 A diagram describing a change over time in the number of recorded frames in the restoration measure processing in the audio reproduction system of FIG. 1.

In accordance with the above-mentioned processing, for example, as shown in FIG. 4, the transmission state is deteriorated, the number of recorded frames becomes 0, and the restoration measure mode is started. After that, the transmission state recovers at a point of time t0 and the number of recorded frames of the reception buffer 33 increases over time.

Then, from the point of time t0 to a point of time t1 after the transmission state recovers, the number of recorded frames gradually increases. After the number of recorded frames exceeds a discard threshold Th, it is controlled to be the number of recorded frames shown by the solid-line circles by discarding a certain number of frames with respect to the number of recorded frames actually transmitted, which are shown by the dotted line circles. In addition, as shown by the solid-line circles at a point of time t2, after the actual number of recorded frames drops below the discard threshold Th, a determination of termination of the restoration measure mode is started.

Note that FIG. 4 shows a change in the number of recorded frames over time after the restoration measure mode is started and the transmission state recovers. In the figure, the horizontal axis indicates an elapsing time and the vertical axis indicates the number of recorded frames. Further, the solid-line circles indicate the actual number of recorded frames controlled by discarding the encoded data in a manner that depends on needs in the restoration measure processing. The dotted-line circles indicate the number of recorded frames in the case where the encoded data is not discarded.

That is, in the above-mentioned processing, the transmission state is deteriorated and the restoration measure mode is started. After that, the transmission state is restored at the point of time t0. The number of recorded frames gradually increases. The discard threshold Th is exceeded. The frame is discarded from the point of time t1 to the point of time t2. Then, after the point of time t2, the actual number of recorded frames drops below the threshold Th. Thus, the discard is stopped. The determination of termination of the restoration measure mode is made at the subsequent timing.

However, as described above, when the restoration measure mode is prolonged, the encoded data is continuously discarded on a frame-by-frame basis. An operation time of the mute controller 38 is prolonged. A state in which normal audio output cannot be performed continues. Therefore, it is desirable to start the determination of termination of the restoration measure mode, as early as possible, and to early terminate the restoration measure mode.

In view of this, if the number of recorded frames rapidly increases per unit time after the restoration measure mode is started, the encoded data may be discarded on a frame-by-frame basis before the number of recorded frames reaches the discard threshold Th. In this manner, the period in which the encoded data is discarded on a frame-by-frame basis may be shortened. Thus, the determination of termination of the restoration measure mode may be started at an early timing and the restoration measure mode may be early terminated.

Figure 5:
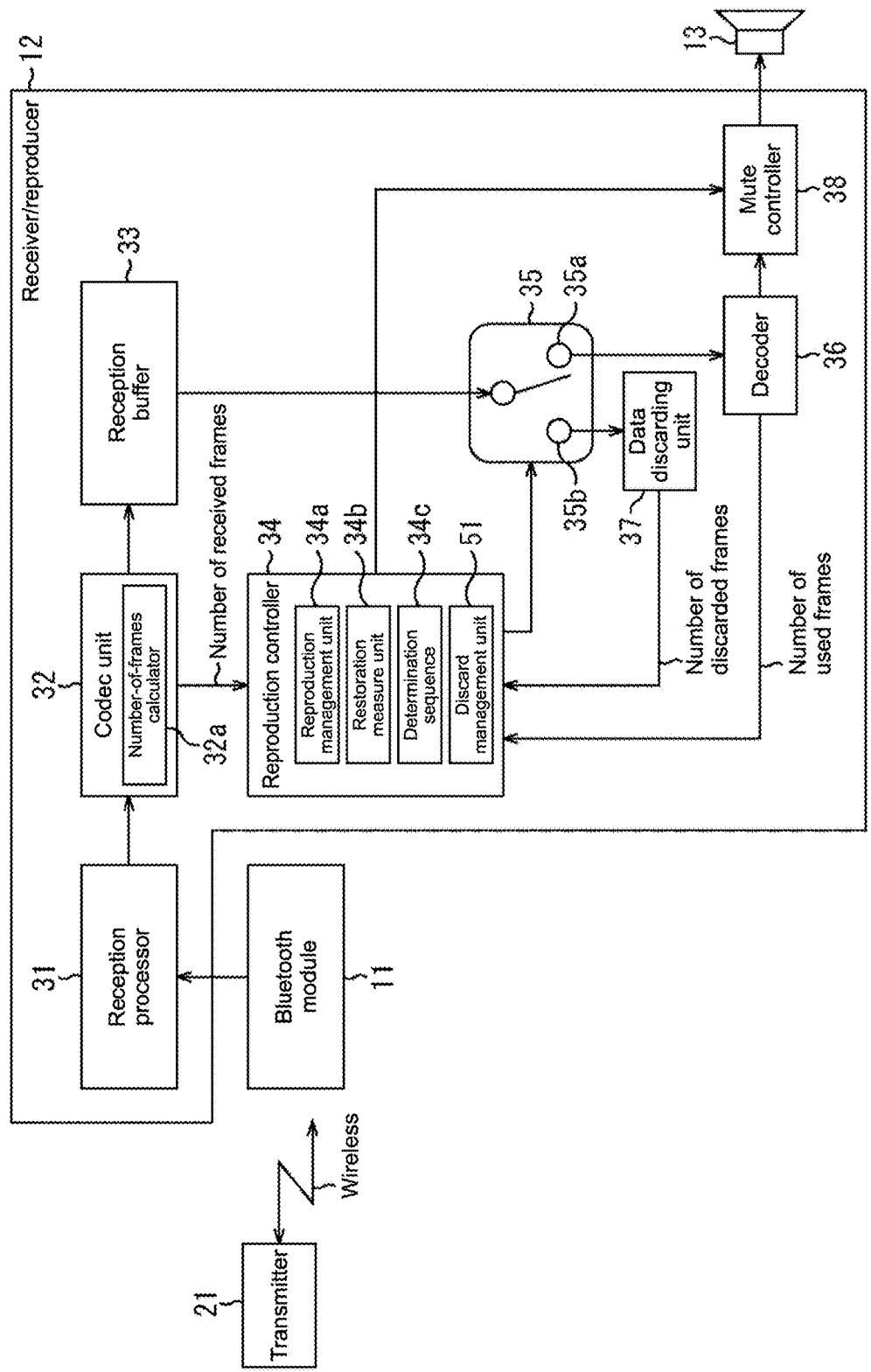
FIG. 5 A diagram describing a configuration example of a second embodiment of the audio reproduction system to which the present technology is applied.

FIG. 5 shows a configuration example of the receiver/reproducer 12. In this configuration example, if the number of recorded frames per unit time rapidly increases after the restoration measure mode is started, the encoded data is discarded on a frame-by-frame basis before it reaches the discard threshold Th. Note that, in the receiver/reproducer 12 of FIG. 5, configurations having functions identical to those of the receiver/reproducer 12 of FIG. 1 will be denoted by identical names and identical symbols and descriptions thereof will be appropriately omitted.

That is, in the receiver/reproducer 12 of FIG. 5, a different point from the receiver/reproducer 12 of FIG. 1 is a point that a discard management unit 51 is provided instead of the discard management unit 34d of the reproduction controller 34.

Although the discard management unit 51 basically has a function identical to that of the discard management unit 34d, a calculation method for the number of frames to be discarded is different.

Specifically, the discard management unit 51 calculates the number of frames to be deleted, on the basis of an increment in the number of recorded frames per unit time. Therefore, in the reception buffer 33, if the increment in the number of recorded frames per unit time is large, encoded data on a frame-by-frame basis that corresponds to the increment is discarded even before the number of recorded frames exceeds the discard threshold Th. Thus, the number of recorded frames becomes a value smaller than the discard threshold Th at an early stage. The period in which the frame is discarded can be shortened. Therefore, it becomes possible to early terminate the restoration measure mode.

Thus, the determination of termination of the restoration measure mode can be early started and the restoration measure mode can be terminated at an early timing. Generation of audio like noise due to discarding the encoded data on a frame-by-frame basis can be suppressed and the period in which mute of the mute controller 38 is on can be shortened.

<Restoration Measure Processing of Receiver/Reproducer of FIG. 5>

Figure 6:
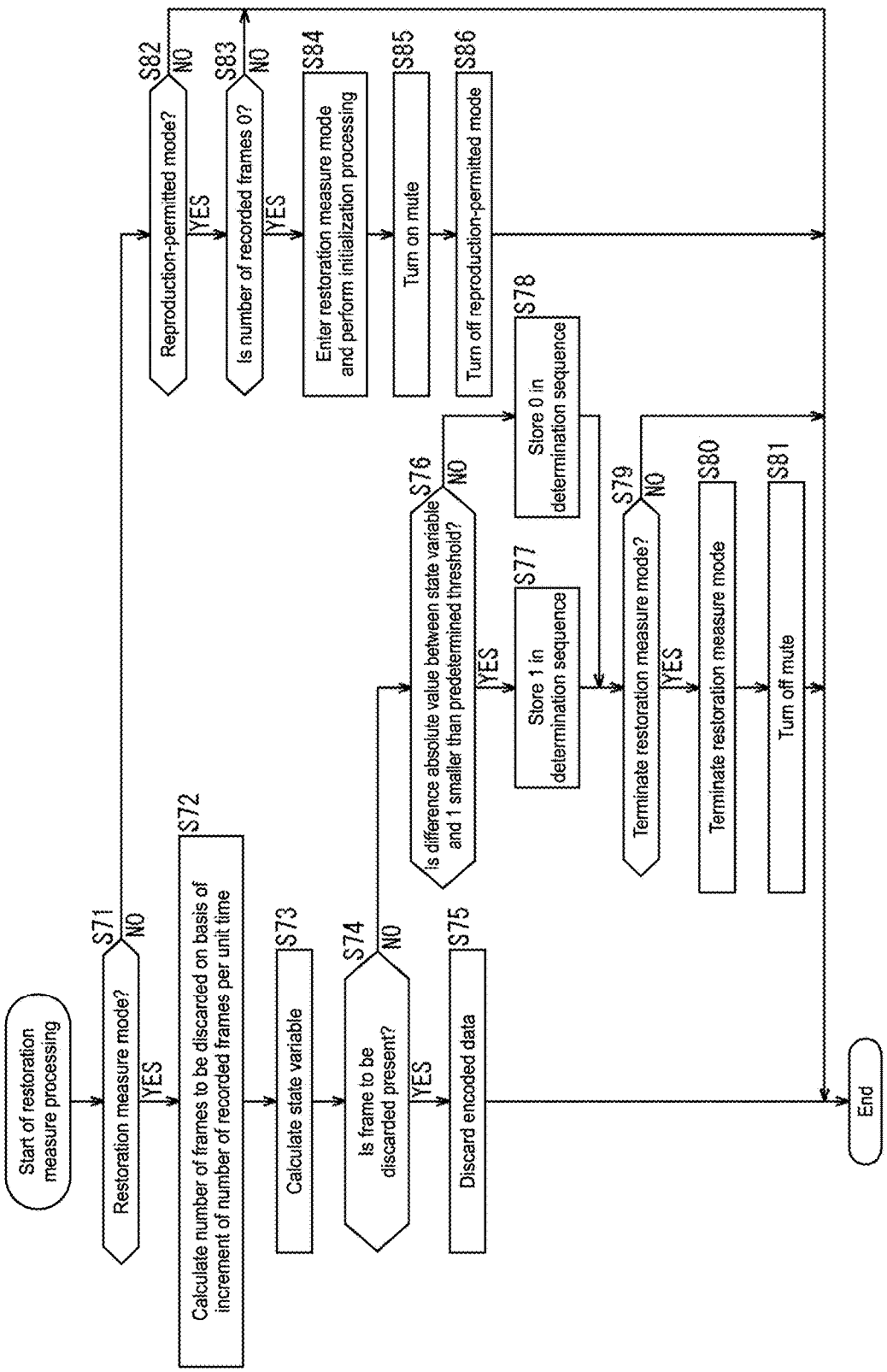
FIG. 6 A flowchart describing restoration measure processing in the audio reproduction system of FIG. 5.

Next, the restoration measure processing by the receiver/reproducer 12 of FIG. 5 will be described with reference to the flowchart of FIG. 6. Note that the reproduction processing is similar to the receiver/reproducer 12 of FIG. 1, and hence a description thereof will be omitted. Further, the processing of Steps S71 and S73 to S86 in the flowchart of FIG. 6 is similar to the processing of Steps S41 and S43 to S56 in the flowchart of FIG. 3, and hence a description thereof will be omitted. That is, a difference of the flowchart of FIG. 6 from the flowchart of FIG. 3 is in the processing of Step S72.

That is, in Step S72, the discard management unit 51 calculates the number of frames to be deleted, on the basis of the increment in the number of recorded frames per unit time.

Figure 7:
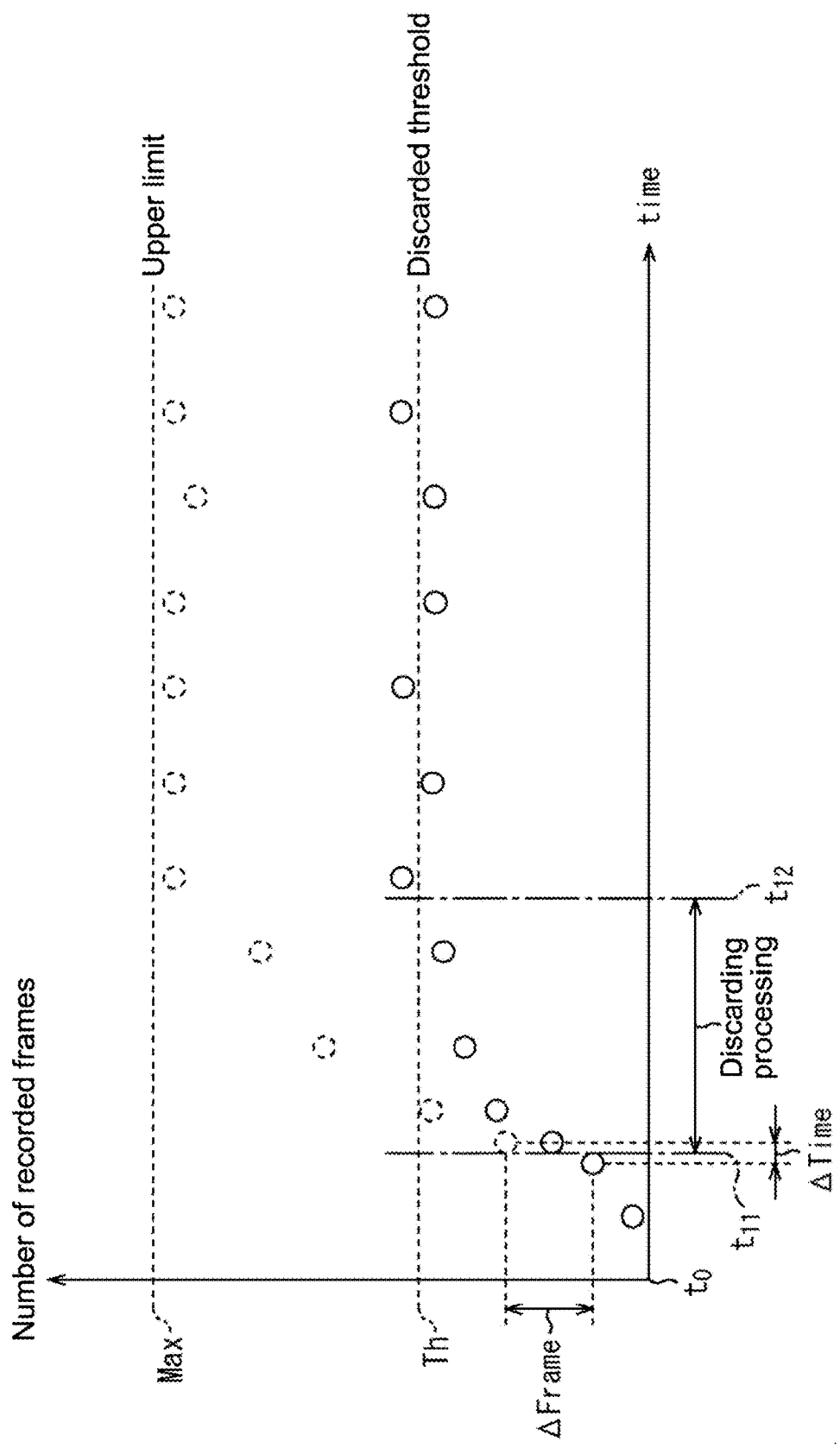
FIG. 7 A diagram describing a change over time in the number of recorded frames in the restoration measure processing in the audio reproduction system of FIG. 5.

More specifically, for example, as shown in FIG. 7, the discard management unit 51 determines an increment ΔFrame/ΔTime per unit time on the basis of an amount of change ΔFrame in the number of recorded frames and a unit time ΔTime. The discard management unit 51 determines a ratio to an amount of change defined on the basis of a normal amount of change defined during design. The discard management unit 51 multiplies this ratio by the amount of change ΔFrame to thereby determine the number of frames to be discarded.

For example, provided that the amount of change ΔFrame in the number of recorded frames is 8, the unit time ΔTime is 10, and the reference value is 0.5, the discard management unit 51 calculates ΔFrame/ΔTime as 0.8 and calculates (0.8−0.5)/0.5=0.6 as a ratio of the reference value to the amount of change. In addition, the discard management unit 51 multiplies the determined value by the amount of change ΔFrame (=8) in the number of recorded frames and rounds it down to thereby determine the number of discarded frames as 4.

In the above-mentioned processing, as shown in FIG. 7, the encoded data is discarded on a frame-by-frame basis correspondingly to the increment before the number of recorded frames exceeds the discard threshold Th. Therefore, the frame to be discarded has been discarded before the discard threshold Th is exceeded. Thus, a period in which the encoded data excessively recorded in the reception buffer 33 is discarded on a frame-by-frame basis to be discarded can be made shorter than the period of the points of time t1 to t2 shown in FIG. 4, as shown in the points of time t11 to t12 of FIG. 7.

Note that, in the receiver/reproducer 12 of FIG. 5, for the sake of simplification of the description, the ratio at a predetermined point of time with respect to the elapsing time is used in calculation as it is. However, ratios at points of time may be determined and a mean of the determined ratios at the points of time may be used. In this case, the influence of variations in reaching time that depend on the transmission environment can be further reduced.

Further, although the example in the communication utilizing Bluetooth (registered trademark) has been described above, the communication protocol is not limited thereto, and communication using other communication protocols may be employed. Further, although the example of transmitting the audio data through communication has been described hereinabove, data other than the audio data may be transmitted as long as it is data stream-reproduced in real time. For example, video data may be transmitted.

As described above, in accordance with the present technology, the apparatus on the reception side can determine a timing to start reproduction, on the basis of the number of frames that is a unit of decoding processing of encoded data recorded in the reception buffer. Thus, even if the compression rate of the encoded data is varied, stable reproduction can be performed without influencing the delay time.

Further, the quantity of encoded data stored in the reception buffer, which corresponds to the number of frames that should start to be reproduced, can be constantly kept. Therefore, even if the compression rate of the encoded data is varied during reproduction, it becomes possible to reduce a necessary minimum memory size that should be ensured, in comparison with the case of performing it on the basis of the number of bytes of the encoded data.

In addition, management is performed in units of decoding processing, for example, on the basis of the number of frames when the encoded data is discarded for keeping the delay constant after transmission is interrupted and restored. Therefore, discarding processing can be performed in units of decoding processing even if the compression rate of the encoded data is varied in a manner that depends on the transmission condition on the transmission side, for example.

Further, in the case where a reproduction system in which encoded data transmitted from a single transmitter is received and reproduced by a plurality of receiver/reproducers 12 is configured, even when packets are transmitted and received at slot intervals as in Bluetooth, for example, the reception side can synchronize and reproduce the packets without preparing an additional synchronization signal as long as only a threshold for determining on/off of the reproduction-permitted mode is consistent.

<Execution Example by Software>

By the way, the above-mentioned series of processing may be executed by hardware or may be executed by software. In the case where the series of processing is executed by software, a program configuring the software is installed from a recording medium into a computer incorporated in dedicated hardware or, for example, a general-purpose personal computer capable of executing various functions by installing various programs.

Figure 8:
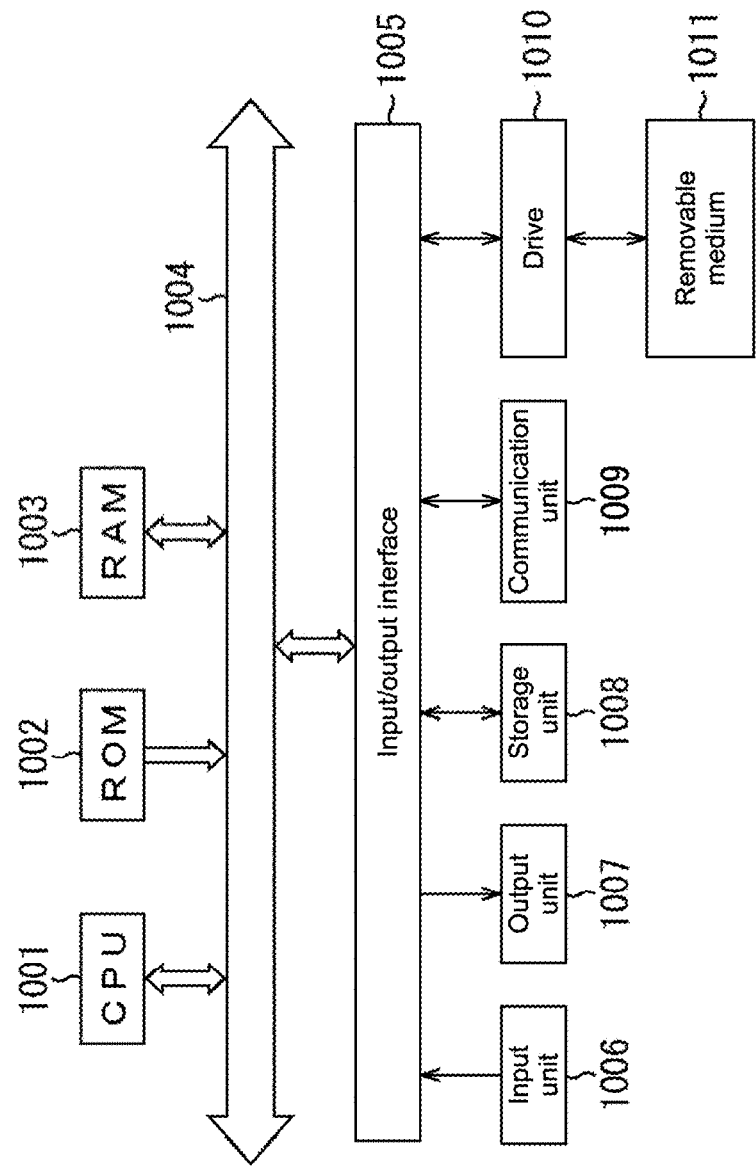
FIG. 8 A diagram describing a configuration example of a general-purpose personal computer.

FIG. 8 shows a configuration example of a general-purpose personal computer. The personal computer incorporates a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

To the input/output interface 1005, connected are a keyboard into which the user inputs operation commands, an input unit 1006 constituted of an input device such as a mouse, an output unit 1007 that outputs processing operation screens and processing result images to a display device, a storage unit 1008 constituted of a hard disk drive and the like that store the program and various types of data, and a communication unit 1009 that is constituted of an LAN (Local Area Network) adapter and the like and executes communication processing via a network represented by the Internet. Further, a drive 1010 is connected thereto. The drive 1010 reads and writes data from/on a removable medium 1011 such as a magnetic disk (including flexible disk), an optical disc (including CD-ROM (Compact Disc-Read Only Memory), a DVD (Digital Versatile Disc)), a magneto-optical disk (including MD (Mini Disc)), and a semiconductor memory.

The CPU 1001 executes various types of processing in accordance with the program stored in the ROM 1002 or the program read from the removable medium 1011 such as a magnetic disk, an optical disc, a magneto-optical disk, and a semiconductor memory and installed into the storage unit 1008, and loaded into the RAM 1003 from the storage unit 1008. Data and the like necessary for the CPU 1001 to execute various types of processing are also appropriately stored in the RAM 1003.

As described above, in the thus configured computer, the above-mentioned series of processing is performed by, for example, the CPU 1001 loading the program stored in the storage unit 1008 into the RAM 1003 via the input/output interface 1005 and the bus 1004 and executing it.

The program executed by the computer (CPU 1001) can be provided while being recorded in the removable medium 1011 as a package medium, for example. Further, the program can be provided via a wired or wireless transmission medium such as a local area network, the Internet, and digital broadcasting.

In the computer, the program can be installed in the storage unit 1008 via the input/output interface 1005 by mounting the removable medium 1011 on the drive 1010. Further, the program can be received by the communication unit 1009 and installed in the storage unit 1008 via a wired or wireless transmission medium. Otherwise, the program can be installed in advance in the ROM 1002 or the storage unit 1008.

Note that the program executed by the computer may be a program whose processes are sequentially performed in the order described herein or may be a program whose processes are performed concurrently or at a necessary timing, for example, upon calling.

Further, herein, the system means a collection of a plurality of components (apparatuses, modules (parts), etc.) and it does not matter whether or not all the components are within an identical casing. Therefore, a plurality of apparatuses housed in separate casings and connected via a network and a single apparatus including a plurality of modules housed within a single casing are both systems.

Note that embodiments of the present technology are not limited to the above-mentioned embodiments and various variants can be made without departing from the gist of the present technology.

For example, the present technology can take a cloud computing configuration in which one function is shared and cooperatively processed by a plurality of apparatuses via a network.

Further, the steps described above with reference to the flowcharts can be shared and executed by a plurality of apparatuses rather than being executed by a single apparatus.

In addition, in the case where a single step includes a plurality of processes, the plurality of processes of the single step can be shared and executed by a plurality of apparatuses rather than being executed by a single apparatus.

It should be noted that the present technology can also take the following configurations.

(1) A signal processing apparatus, including:

a receiver that receives encoded data including data encoded in accordance with a predetermined encoding method, which is transmitted;

a storage unit that stores the encoded data received by the receiver;

a decoder that decodes the encoded data stored in the storage unit, in accordance with a method corresponding to the predetermined encoding method; and a decoding management unit that controls decoding by the decoder to be permitted on the basis of the number of units of decoding processing in the encoded data, which are stored in the storage unit, in the predetermined encoding method when decoded by the decoder.

(2) The signal processing apparatus according to (1), in which the decoding management unit controls decoding by the decoder to be permitted when the number of units of decoding processing in the encoded data, which are stored in the storage unit, is larger than a predetermined threshold.

(3) The signal processing apparatus according to (1) or (2), further including a switching unit that switches an output of the storage unit to the decoder or others, and the decoding management unit controls, when the number of units of decoding processing in the encoded data, which are stored in the storage unit, is larger than a predetermined threshold, the switching unit to connect the output of the storage unit to the decoder to thereby control decoding by the decoder to be permitted.

(4) The signal processing apparatus according to any one of (1) to (3), further including a restoration measure unit that determines, on the basis of the number of units of decoding processing in the encoded data, which are stored in the storage unit, whether or not to turn on a restoration measure mode on which a restoration measure processing is performed, and performs the restoration measure processing, the restoration measure processing being a measure for preventing a state in which all the encoded data cannot be decoded by the decoder in the case where a transmission state of the encoded data is delayed due to deterioration of a transmission environment and then the transmission environment is restored and the encoded data are collectively transmitted.

(5) The signal processing apparatus according to (4), in which the restoration measure unit turns on the restoration measure mode when the number of units of decoding processing in the encoded data, which are stored in the storage unit, is 0, the apparatus further including a discard management unit that discards, in units of decoding processing, part of the encoded data stored in the storage unit when the restoration measure mode is on and the number of units of decoding processing in the encoded data, which are stored in the storage unit, is larger than a reference value based on the predetermined threshold.

(6) The signal processing apparatus according to (5), in which the discard management unit discards, in units of decoding processing, encoded data stored in the storage unit, which exceeds the reference value based on the predetermined threshold in terms of the number of units of decoding processing.

(7) The signal processing apparatus according to (5), in which the discard management unit discards, in units of decoding processing, the encoded data stored in the storage unit, which corresponds to a quantity set correspondingly to an increment in the number of units of decoding processing per unit time.

(8) The signal processing apparatus according to (5), further including:

a switching unit that switches an output of the storage unit to the decoder or others; and a discard unit that discards, in units of decoding processing, part of the encoded data stored in the storage unit, in which the discard management unit controls, when discarding, in units of decoding processing, the part of the encoded data stored in the storage unit, the switching unit to connect the output of the storage unit to the discard unit to thereby discard, in units of decoding processing, the part of the encoded data stored in the storage unit.

(9) The signal processing apparatus according to (4), in which the restoration measure unit calculates a state variable at predetermined time intervals on the basis of a mean and a variance of the number of units of decoding processing in the encoded data, which are stored in the storage unit, in a predetermined period, and turns off the restoration measure mode when a state in which a difference absolute value from a predetermined reference value is smaller than a predetermined threshold continues.

(10) The signal processing apparatus according to (4), further including a sequence that stores a comparison result obtained by the restoration measure unit comparing a difference absolute value between the state variable, which is calculated at the predetermined time intervals, and a predetermined reference value with a predetermined threshold, in which the restoration measure unit turns off the restoration measure mode when a state in which the state variable calculated at the predetermined time intervals on the basis of the comparison result stored in the sequence, the difference absolute value from the predetermined reference value is smaller than the predetermined threshold continues.

(11) The signal processing apparatus according to any one of (1) to (4), in which the encoded data is obtained by encoding audio data to be output as audio through a speaker, the apparatus further including a mute controller that controls an output level of audio from the speaker, which is based on the audio data decoded by the decoder, in which when the restoration measure mode is on, the mute controller controls the output level of the audio from the speaker, which is based on the audio data decoded by the decoder, to be lowered.

(12) A signal processing method, including the steps of:

receiving encoded data including data encoded in accordance with a predetermined encoding method, which is transmitted;

storing the received encoded data;

decoding the stored encoded data in accordance with a method corresponding to the predetermined encoding method; and controlling decoding to be permitted on the basis of the number of units of decoding processing in the stored encoded data in the predetermined encoding method when decoded.

(13) A program that causes a computer to function as:

a receiver that receives encoded data including data encoded in accordance with a predetermined encoding method, which is transmitted;

a storage unit that stores the encoded data received by the receiver;

a decoder that decodes the encoded data stored in the storage unit, in accordance with a method corresponding to the predetermined encoding method; and a decoding management unit that controls decoding by the decoder to be permitted on the basis of the number of units of decoding processing in the encoded data, which are stored in the storage unit, in the predetermined encoding method when decoded by the decoder.

REFERENCE SIGNS LIST

11 Bluetooth module, 12 receiver/reproducer, 13 speaker, 21 transmitter, 31 reception processor, 32 codec unit, 32*a* number-of-frames calculator, 33 reception buffer, 34 reproduction controller, 34*a* reproduction management unit, 34*b* restoration measure unit, 34*c* determination sequence, 34*d* discard management unit, 35 switch, 35*a*, 35*b* terminal, 36 decoder, 37 data discarding unit, 38 mute controller, 51 discard management unit

The invention claimed is:

1. A signal processing apparatus, comprising:
a receiver that receives encoded data comprising data encoded in accordance with a predetermined encoding method, which is transmitted;
a buffer that stores the encoded data received by the receiver;
a decoder that decodes the encoded data stored in the buffer in accordance with a method corresponding to the predetermined encoding method;
a controller that controls decoding by the decoder when the number of units of decoding processing in the encoded data, which are stored in the buffer, is larger than a predetermined threshold, in the predetermined encoding method when decoded by the decoder; and
a restoration measure unit that determines, on the basis of the number of units of decoding processing in the encoded data, which are stored in the buffer, whether or not to turn on a restoration measure mode on which a restoration measure processing is performed, and performs the restoration measure processing, the restoration measure processing being a measure for preventing a state in which all the encoded data cannot be decoded by the decoder in the case where a transmission state of the encoded data is delayed due to deterioration of a transmission environment and then the transmission environment is restored and the encoded data are collectively transmitted.

2. The signal processing apparatus according to claim 1, further comprising
a switching unit that switches an output of the buffer to the decoder or others.

3. The signal processing apparatus according to claim 1, wherein
the restoration measure unit turns on the restoration measure mode when the number of units of decoding processing in the encoded data, which are stored in the storage unit, is 0, the apparatus further comprising
a discard management unit that discards, in units of decoding processing, part of the encoded data stored in the buffer when the restoration measure mode is on and the number of units of decoding processing in the encoded data, which are stored in the storage unit, is larger than a reference value based on the predetermined threshold.

4. The signal processing apparatus according to claim 3, wherein
the discard management unit discards, in units of decoding processing in the encoded data stored in the buffer, which exceeds the reference value based on the predetermined threshold in terms of the number of units of decoding processing.

5. The signal processing apparatus according to claim 3, wherein the discard management unit discards, in units of decoding processing in the encoded data stored in the buffer, which corresponds to a quantity set correspondingly to an increment in the number of units of decoding processing per unit time.

6. The signal processing apparatus according to claim 3, further comprising:
a discard unit that discards, in units of decoding processing, part of the encoded data stored in the buffer, wherein
the discard management unit controls, when discarding, in units of decoding processing, the part of the encoded data stored in the buffer, the controller to connect the output of the buffer to the discard unit to thereby discard, in units of decoding processing, the part of the encoded data stored in the buffer.

7. The signal processing apparatus according to claim 1 wherein the restoration measure unit calculates a state variable at predetermined time intervals on the basis of a mean and a variance of the number of encoded data in units of decoding processing, which are stored in the buffer, in a predetermined period, and turns off the restoration measure mode when a state in which a difference absolute value from a predetermined reference value is smaller than a predetermined threshold continues.

8. The signal processing apparatus according to claim 1, further comprising
a sequence that stores a comparison result obtained by the restoration measure unit comparing a difference absolute value between the state variable, which is calculated at the predetermined time intervals, and a predetermined reference value with a predetermined threshold, wherein the restoration measure unit turns off the restoration measure mode when a state in which the state variable calculated at the predetermined time intervals on the basis of the comparison result stored in the sequence, the difference absolute value from the predetermined reference value is smaller than the predetermined threshold continues.

9. The signal processing apparatus according to claim 1, wherein
the encoded data is obtained by encoding audio data to be output as audio through a speaker, the apparatus further comprising
a mute controller that controls an output level of audio from the speaker, which is based on the audio data decoded by the decoder, wherein when the restoration measure mode is on, the mute controller controls the output level of the audio from the speaker, which is based on the audio data decoded by the decoder, to be lowered.

10. A signal processing method, comprising:
receiving, by a receiver, encoded data comprising data encoded in accordance with a predetermined encoding method, which is transmitted; storing, by a buffer, the received encoded data; decoding, by a decoder, the stored encoded data in accordance with a method corresponding to the predetermined encoding method;
controlling, by a controller, decoding when a number of units of decoding processing in the stored encoded data is larger than a predetermined threshold, in the predetermined encoding, method when decoded; and
determining, on the basis of the number of units of decoding processing in the encoded data, which are stored in the buffer, whether or not to turn on a restoration measure mode on which a restoration measure processing is performed, and performing the restoration measure processing, the restoration measure processing being a measure for preventing a state in which all the encoded data cannot be decoded by the decoder in the case where a transmission state of the encoded data is delayed due to deterioration of a transmission environment and then the transmission environment is restored and the encoded data are collectively transmitted.

11. A non-transitory computer-readable medium storing instructions that, when executed by a computer, cause the computer to function as:
a receiver that receives encoded data comprising data encoded in accordance with a predetermined encoding method, which is transmitted;
a buffer that stores the encoded data received by the receiver;
a decoder that decodes the encoded data stored in the buffer, in accordance with a method corresponding to the predetermined encoding method;
a controller, that controls decoding by the decoder when the number of units of decoding processing in the encoded data, which are stored in the buffer, is larger than a predetermined threshold, in the predetermined encoding method when decoded by the decoder; and
a restoration measure unit that determines, on the basis of the number of units of decoding processing in the encoded data, which are stored in the buffer, whether or not to turn on a restoration measure mode on which a restoration measure processing is performed, and performs the restoration measure processing, the restoration measure processing being a measure for preventing a state in which all the encoded data cannot be decoded by the decoder in the case where a transmission state of the encoded data is delayed due to deterioration of a transmission environment and then the transmission environment is restored and the encoded data are collectively transmitted.

* * * * *